UNITED STATES PATENT OFFICE.

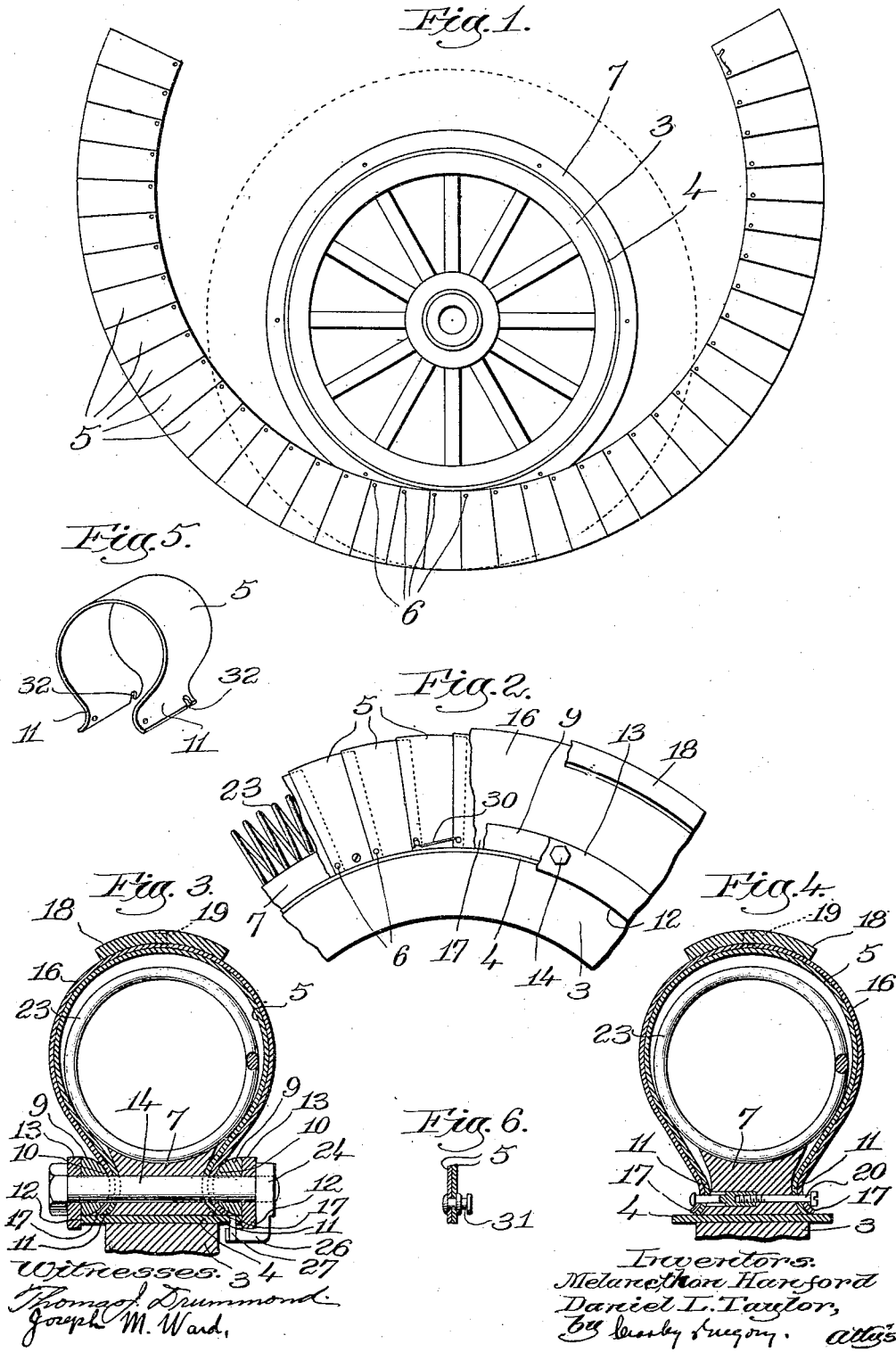

MELANCTHON HANFORD AND DANIEL LEE TAYLOR, OF MALDEN, MASSACHUSETTS; SAID HANFORD ASSIGNOR TO SAID TAYLOR.

RESILIENT TIRE.

1,018,049.  Specification of Letters Patent.  Patented Feb. 20, 1912.

Application filed August 16, 1910. Serial No. 577,42.

*To all whom it may concern:*

Be it known that we, MELANCTHON HANFORD and DANIEL L. TAYLOR, citizens of the United States, and residents of Malden, county of Middlesex, State of Massachusetts, have invented an Improvement in Resilient Tires, of which the following description, in connection with the accompanying drawing, is a specification, like characters on the drawing representing like parts.

This invention has for its object to provide a novel resilient tire for automobiles and similar vehicles in which the resiliency is secured by the use of spring metal and without the use of air, as is common in pneumatic tires. The advantage of this is that the tire cannot be rendered inoperative by puncturing and it does not require rubber in its manufacture and can, therefore, be made much more cheaply than rubber tires with the present prevailing high prices of rubber.

The features wherein our invention resides will be hereinafter described and then pointed out in the appended claim.

Figure 1 is a view of a wheel showing the method of applying our improved tire thereto; Fig. 2 is a view of a portion of our improved tire with parts broken out to better show the construction; Fig. 3 is a transverse section through a tire embodying our invention; Fig. 4 is a similar section showing the manner of securing the tread member to the tire; Fig. 5 is a perspective view of one of the load-supporting arches; Fig. 6 is a detail showing the manner of connecting the series of arches together.

3 designates the usual wooden felly of the wheel and 4 the steel rim which is commonly applied thereto. The body of our improved tire is composed of a plurality of spring metal load-supporting arches 5 which are sustained by the steel rim 4 and are preferably arranged in overlapping relation, as clearly seen in Fig. 2. These spring arches are connected together and we preferably do this by means of rivets 6 so that the adjacent arches can have some play relative to each other. Situated between the sides of the arches at their inner ends is a base piece 7 which may be made of any suitable material either wood or metal. This is preferably in the form of a ring which fits about the steel rim 4. The sides of the base piece are shown as hollowed out or curved, and the inner ends of the steel arches are also preferably curved to fit said curved sides.

The load-supporting arches 5 may be secured to the rim in any suitable way, but we preferably use two clamping rings 9, one on each side of the tire and each provided with a rounded side 10 that fits the curved ends 11 of the steel arches. Each clamping ring 10 has associated therewith a flange 12 which engages the edges of the steel rim 4 and these flanges 12 are herein shown as forming part of separate rings 13. The clamping rings 9 are clamped in position by means of bolts 14 which pass through them and through the base piece 7, as clearly seen in the drawings. We prefer to use a tread member on the exterior of these steel arches which is of some suitable material adapted to resist wear and of such a composition that it will not be noisy when running over a hard road surface. In the present embodiment we have shown a tread member formed by an envelop 16 of leather which is placed about the spring arches, as clearly seen in the drawings, and the inner edges 17 of which are clamped between the clamping rings 9 and the inner edges of the spring arches. This envelop may be thickened at the tread portion if desired in order to provide added wearing qualities, and one convenient way of thickening it is to apply thereto an extra strip 18 of leather at the tread portion which strip is secured to the envelop in any suitable way, as by means of rivets 19. For temporarily holding the envelop 16 in place while the parts are being assembled or when the clamping rings 9 are removed, we provide one or more male and female bolts 20 and 21, respectively, such as shown in Fig. 4, and which are adapted to be inserted through apertures in the edge of the envelop 16 and into apertures in the base piece 7, and which are screw-threaded together within the body of the base piece, as shown.

The arches 5 are intended to be made strong enough to support the ordinary load, but as an auxiliary supporting means, we propose to employ an auxiliary spring situated within the spring arches and which is herein shown as formed of a coiled spring 23 which encircles the base piece 7 and is held in place by the tension of the spring. The diameter of this spring is smaller than that of the spring arches so that under normal conditions the auxiliary spring 23 does not support any load. If, however, the tire is sustaining a heavy load so that the spring arches are flattened beyond a certain point they come into contact with the auxiliary spring 23 which then comes into play to assist in supporting the load.

The tire including the base piece 7 may be prevented from creeping on the wheel in a variety of ways without departing from the invention. One way would be to provide the nuts 24 on the clamping bolts 14 with tail pieces or fingers 26 which are shaped to fit under the overhanging edge of the steel rim 4, as shown in Fig. 3, and to provide said rim with radially-extending pins, or projections 27 which engage these fingers and thus prevent the tire from creeping. The advantage of this manner of preventing the tire from creeping is that the tire as an entity including the base piece 7 is not secured to the rim by screws or other fastening devices.

In assembling the parts of the tire the base piece 7 may first be placed on the rim and the auxiliary coiled spring 23 may then be slipped into the series of connected arches and thereafter the arches with the spring therein may be laid around the wheel, as shown in Fig. 1. In assembling the spring arches for any one wheel we will preferably rivet the required number of them together to make a string of connected arches which can be placed around the wheel, as shown in Fig. 1, and when they are in position the two ends of the connected series of arches can be fastened together by any suitable means, such, for instance, as a spring catch 30 which fits over a pin or projection on one of the arches. The arch at one end is shown as having a slot 32 which fits over this pin 31 as the two end arches of the series are brought together. After the spring arches are thus placed in position, the envelop 16 may be applied and secured and thereafter the clamping rings 9 may be placed in position, as will be obvious.

This tire is quite simple to make and its manufacture does not necessitate the use of any expensive material, such as rubber. Moreover since the resiliency of the tire does not depend on compressed air the tire is non-puncturable.

While we have illustrated the preferred embodiment of our invention, we do not wish to be limited to the construction shown.

Having fully described our invention, what we claim as new and desire to secure by Letters Patent is:—

In a wheel, the combination with a wheel rim, of an annular base piece encircling the rim and having concaved sides, a plurality of load supporting arches, each having its sides curved to fit the curved sides of the base piece, a wear envelop encircling and inclosing the arches, bolts passing through the base piece and the edges of the envelop for securing the latter in position, said bolts each having a male and a female section having screw threaded engagement with each other within the base piece, clamping rings extending around the base piece and having convex sides to fit the concave shape of the load-supporting arches, bolts extending through the base piece, arches and rings and clamping the parts in position, and means associated with the last mentioned bolts and coöperating with the wheel rim, to prevent creeping of the tire.

In testimony whereof, we have signed our names to this specification, in the presence of two subscribing witnesses.

MELANCTHON HANFORD.
DANIEL LEE TAYLOR.

Witnesses:
   Louis C. Smith,
   Thomas J. Drummond.